US011885405B2

United States Patent
Gu et al.

(10) Patent No.: US 11,885,405 B2
(45) Date of Patent: Jan. 30, 2024

(54) HOUSING FOR PLASTIC GEARBOX AND ASSOCIATED PLASTIC GEARBOX AND ROBOT

(71) Applicant: ABB Schweiz AG, Baden (CH)

(72) Inventors: Hao Gu, Shanghai (CN); Jibo Yang, Shanghai (CN); Han Chen, Shanghai (CN); Wei Song, Shanghai (CN); Jiafan Zhang, Shanghai (CN)

(73) Assignee: ABB Schweiz AG, Baden (CH)

( * ) Notice: Subject to any disclaimer, the term of this patent is extended or adjusted under 35 U.S.C. 154(b) by 298 days.

(21) Appl. No.: 17/296,743

(22) PCT Filed: Dec. 10, 2018

(86) PCT No.: PCT/CN2018/120134
§ 371 (c)(1),
(2) Date: May 25, 2021

(87) PCT Pub. No.: WO2020/118493
PCT Pub. Date: Jun. 18, 2020

(65) Prior Publication Data
US 2021/0396307 A1 Dec. 23, 2021

(51) Int. Cl.
*F16H 1/32* (2006.01)
*F16H 57/032* (2012.01)
(Continued)

(52) U.S. Cl.
CPC ............ *F16H 57/032* (2013.01); *B25J 9/102* (2013.01); *F16H 1/32* (2013.01);
(Continued)

(58) Field of Classification Search
CPC ............ F16H 1/32–34; F16H 57/02–2057/125
See application file for complete search history.

(56) References Cited

U.S. PATENT DOCUMENTS

| 4,990,839 A * | 2/1991 | Schonlau ................. B25J 9/161 318/568.17 |
| 5,123,883 A * | 6/1992 | Fukaya ..................... F16H 1/32 475/162 |

(Continued)

FOREIGN PATENT DOCUMENTS

| CN | 201303266 Y | 9/2009 |
| CN | 203363083 U | 12/2013 |

(Continued)

OTHER PUBLICATIONS

Chinese National Intellectual Property Administration, International Search Report in International Patent Application No. PCT/CN2018/120134, 5 pp. (dated Aug. 28, 2019).

(Continued)

*Primary Examiner* — Ernesto A Suarez
*Assistant Examiner* — Lillian T Nguyen
(74) *Attorney, Agent, or Firm* — Leydig, Voit & Mayer, Ltd.

(57) ABSTRACT

A housing for a plastic gearbox and associated plastic gearbox and a robot. The housing includes a body including an inner engaging portion circumferentially arranged on an inner surface of the body, the inner engaging portion adapted to be engaged with a transmission assembly of the plastic gearbox; and an adjusting mechanism arranged around the body and operable to squeeze the body inwardly to reduce an inner diameter of the body. By using the adjusting mechanism to squeeze the body of the housing inwardly, the fit error between the inner engaging portion and the transmission assembly can be compensated in an efficient way. Furthermore, the adjusting mechanism is a part of the housing and thus the body of the housing which is made of plastic does not need to be too thick, which makes injection molding easier and manufacturing precision improved.

19 Claims, 4 Drawing Sheets

(51) Int. Cl.
*B25J 9/10* (2006.01)
*F16H 57/02* (2012.01)
*F16H 57/12* (2006.01)

(52) U.S. Cl.
CPC .............. *F16H 2057/02021* (2013.01); *F16H 2057/0325* (2013.01); *F16H 2057/125* (2013.01)

(56) References Cited

U.S. PATENT DOCUMENTS

| | | | |
|---|---|---|---|
| 9,400,035 B1* | 7/2016 | Edsinger | F16H 1/34 |
| 2004/0055404 A1 | 3/2004 | Mills et al. | |
| 2011/0319217 A1* | 12/2011 | Imase | F16H 1/32 |
| | | | 475/168 |
| 2016/0333966 A1* | 11/2016 | Kataoka | F16H 1/32 |

FOREIGN PATENT DOCUMENTS

| | | |
|---|---|---|
| CN | 204647211 U | 9/2015 |
| CN | 106438859 A | 2/2017 |
| CN | 206268385 U | 6/2017 |
| CN | 207018478 U | 2/2018 |
| DE | 202018101462 U1 | 4/2018 |

OTHER PUBLICATIONS

Chinese National Intellectual Property Administration, Written Opinion in International Patent Application No. PCT/CN2018/120134, 4 pp. (dated Aug. 28, 2019).

European Patent Office, Extended European Search Report in European Patent Application No. 18943341.0, 9 pp. (dated Jun. 22, 2022).

China National Intellectual Property Administration, Office Action in Chinese Patent Application No. 201880099775.5, 8 pp. (dated Apr. 1, 2023).

* cited by examiner

HOUSING FOR PLASTIC GEARBOX AND ASSOCIATED PLASTIC GEARBOX AND ROBOT

CROSS-REFERENCE TO RELATED APPLICATIONS

This patent application is a U.S. national phase patent application of International Patent Application No. PCT/CN2018/120134, filed Dec. 10, 2018, which is fully incorporated herein by reference for all purposes.

FIELD

Embodiments of the present disclosure generally relate to a housing for a plastic gearbox as well as associated robot joint and robot.

BACKGROUND

A planetary gearbox is a gear system comprising one or more outer gears (i.e., planet gears) rotating about a central gear (i.e., sun gear). Typically, the planet gears are mounted on a movable arm or carrier, which itself may rotate relative to the sun gear. The planetary gearbox also incorporates the use of an outer ring gear or annulus engaging with the planet gears. Planetary gears are typically classified as simple or compound planetary gears. Simple planetary gears have one sun, one ring, one carrier, and one planet set.

As a kind of special planetary gearbox, a cycloidal speed reducer is capable of relatively high ratios in compact sizes. An input shaft of the cycloidal speed reducer drives an eccentric bearing that in turn drives the wheel in an eccentric, cycloidal motion. A perimeter of this wheel is geared to a stationary ring gear and has a series of output shaft pins or rollers placed through the face of the wheel. These output shaft pins directly drive the output shaft as the wheel rotates. The radial motion of the wheel is not translated to the output shaft.

In order to reduce the cost and weight of the gearbox and associated robot, a plastic gearbox, such as plastic cycloidal gearbox has been proposed. Most parts of the plastic gearbox such as housings are made of plastic with injection molding and no further machining process is needed. However, the parts made by injection molding are less accurate.

SUMMARY

Embodiments of the present disclosure provide a housing for a plastic gearbox that can compensate a fit error.

In a first aspect, a housing for a plastic gearbox is provided. The housing comprises a body comprising an inner engaging portion circumferentially arranged on an inner surface of the body, the inner engaging portion adapted to be engaged with a transmission assembly of the plastic gearbox; and an adjusting mechanism arranged around the body and operable to squeeze the body inwardly to reduce an inner diameter of the body.

By using the adjusting mechanism to squeeze the body of the housing inwardly, the fit error between the inner engaging portion and the transmission assembly can be compensated in an efficient way. Furthermore, the adjusting mechanism is a part of the housing and thus the body of the housing which is made of plastic does not need to be too thick, which makes injection molding easier and manufacturing precision improved.

In some embodiments, the body comprises a first taper portion and a second taper portion axially arranged on an outer surface of the body, the first and second taper portions tapering in a direction away from each other, and wherein the adjusting mechanism comprises a first squeeze body surrounding the first taper portion and comprising an inner surface fitted with the first taper portion; a second squeeze body surrounding the second taper portion and comprising an inner surface fitted with the second taper portion; and a plurality of adjusting elements arranged in a circumferential direction of the adjusting mechanism and coupled to the first and second squeeze bodies, the adjusting element being operable to move the first and second squeeze bodies towards each other to thereby squeeze the body. In this way, the body of the housing can be squeezed evenly. Furthermore, the adjusting element is easily operated without disassembling the plastic gearbox.

In some embodiments, the adjusting mechanism further comprises a spacer arranged between the first and second squeeze bodies, the spacer defining a minimum distance between the first and second squeeze bodies. By using the spacer between the first and second squeeze bodies, the excessive compression of the body may be prevented and the compensation of the fit error becomes easier.

In some embodiments, the adjusting element comprises an adjusting bolt having a self-locking helix angle. As a result, the looseness of the adjusting element can be prevented, thereby improving the stability of the housing and the plastic gearbox.

In some embodiments, the plurality of adjusting elements are evenly arranged in the circumferential direction of the adjusting mechanism. With this arrangement, the adjusting mechanism is more evenly stressed, improving stability.

In some embodiments, the adjusting mechanism comprises an adjusting hoop surrounding the body and comprising a separating portion breaking the adjusting hoop in an axial direction; and at least one adjusting element arranged tangentially at the separating portion and operable to reduce a circumferential size of the separating portion to thereby squeeze the body. The adjusting hoop provides another way to squeeze the body and makes the compensation of the fit error easier.

In some embodiments, the body is of a cylinder shape. In this way, the body can be manufactured and assembled more easily.

In some embodiments, the inner engaging portion comprises a plurality of cylinder pins arranged evenly in the inner surface of the body. For the plastic cycloidal gearbox, with the body being squeezed, the cylinder pin can be assembled on the body more easily and the engagement between the cylinder pin and the body becomes tighter.

In second aspect, a plastic gearbox comprising a housing as mentioned above and a transmission assembly operable to be engaged with an inner engaging portion of the housing.

In third aspect, a robot comprising at least one of the above mentioned plastic gearboxes is provided.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through FIG. 1 shows a sectional side view of a traditional plastic gearbox.

Throughout the drawings, the same or similar reference symbols are used to indicate the same or similar elements.

DETAILED DESCRIPTION

The present disclosure will now be discussed with reference to several example embodiments. It is to be understood these embodiments are discussed only for the purpose of enabling those skilled persons in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

In the conventional solutions, robot joints typically employ a planetary gearbox, in particular a cycloidal type planetary gearbox (i.e., a cycloidal drive or a cycloidal speed reducer), as deceleration and transmission devices. Various components used in the planetary gearbox are all usually made of metal materials, making the planetary gearboxes heavy and do not meet the lightweight requirements to robots or robot joints.

Figure 1:
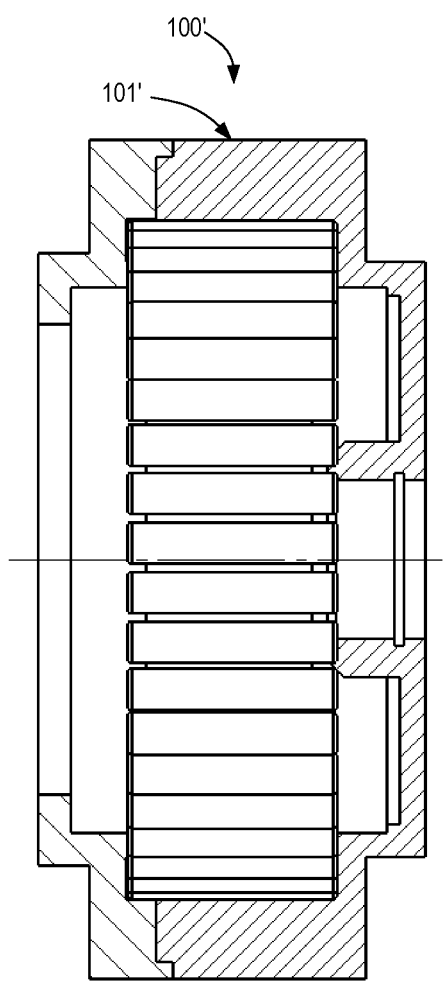

In order to reduce the cost and the total weight of the gearbox, a plastic gearbox has been developed. Most parts of the plastic gearbox 100' are made of plastic with an injection molding process. For example, for the plastic cycloidal gearbox as shown in FIG. 1, the housing 101' is made of plastic. As to the injection molding process, the accuracy of the housing may be affected by raw material and process parameters. As a result, the accuracy of the housing is not high enough to meet the requirement of the engagement between the inner engaging portion of the housing and the transmission assembly.

The above problem causes the plastic gearbox can only be for low precision transmission application. Nevertheless, too big backlash between the inner engaging portion of the housing and the transmission assembly will cause too much vibration, noise and further reduce the lifetime of the plastic gearbox. Therefore, it is still expected to control the backlash at a certain level while keeping the low-cost molding without struggling on special machining process.

In addition, in order to meet the strength requirements, the traditional plastic housings usually have a thicker wall, which increases the requirement for the injection molding process. Even so, air bubbles are often trapped in the wall to affect the overall strength of the housing.

In order to solve or at least partly solve the above problems, embodiments of the present disclosure provide a planetary gearbox.

In the course of the research, the inventor has discovered that comparing with metal materials, less stiffness of plastic is usually known as one of the disadvantages. On the other hand, less stiffness means flexible and compliant and can be used for compensating the rigid geometry accuracy. With this discovery, a housing for a plastic gearbox that can compensate the fit error is provided. Now some example embodiments will be described with reference to FIGS. 2-4.

Figure 2:
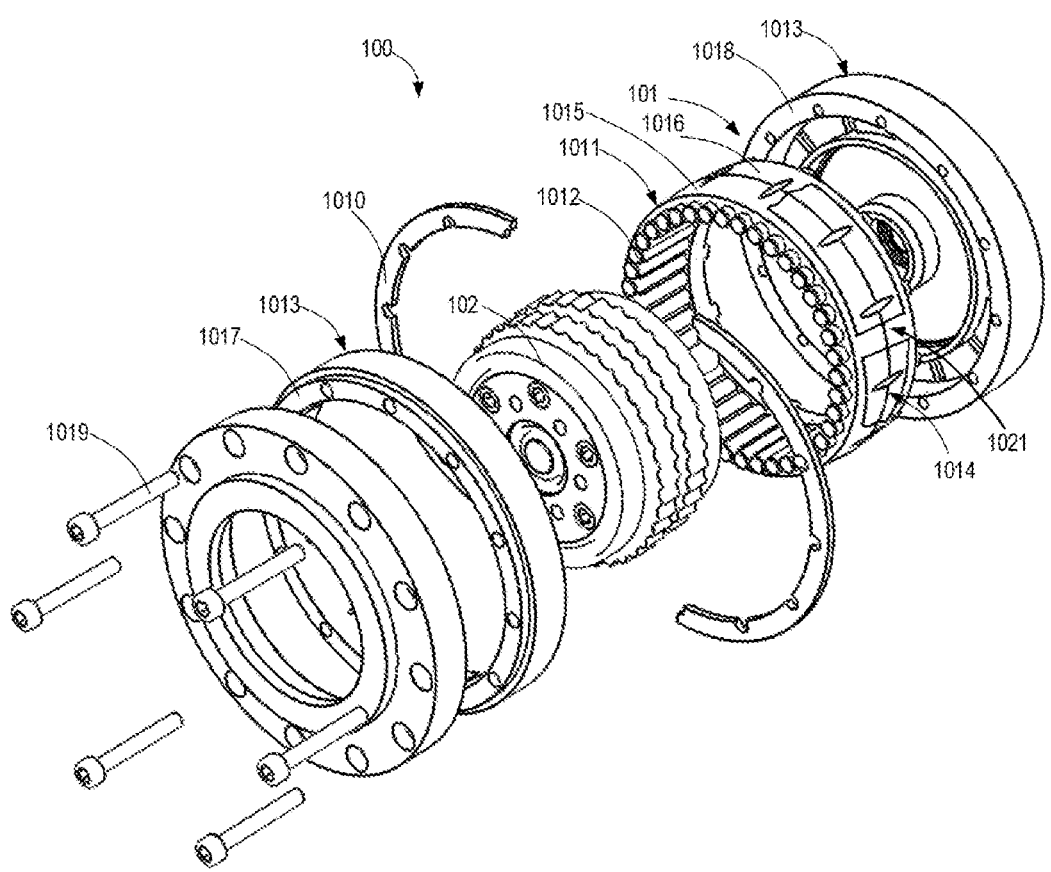
FIG. 2 shows an exploded view of a plastic gearbox according to embodiments of the present disclosure.

FIG. 2 shows an exploded view of a plastic gearbox 100 according to embodiments of the present disclosure. As shown, the housing for the plastic gearbox 100 generally comprises a body 1011 and an adjusting mechanism 1013. The body 1011 comprises an inner engaging portion 1012 circumferentially arranged on an inner surface of the body 1011. As shown, the inner engaging portion 1012 may be a plurality of cylinder pins.

It should be understood that the inner engaging portion 1012 comprising a plurality of cylinder pins as shown in FIG. 2 is merely for illustration, without suggesting any limitations as to the scope of the present disclosure. Any other suitable structures and arrangements are possible as well. For example, in some embodiments, for the common planetary gearbox, the inner engaging portion 1012 may also comprise inner gear teeth integrally formed or arranged on the inner surface of the body 1011. Furthermore, in some alternative embodiments, the inner engaging portion 1012 may also comprise a frictional surface. That is, the inner surface of the body 1011 may engage with the transmission assembly by the friction therebetween.

The inner engaging portion 1012 can be engaged with a transmission assembly 102 of the plastic gearbox 100. Specifically, for the cycloidal gearbox, the transmission assembly 102 may be cycloidal gears as shown in FIG. 2. For the common planetary gearbox, the transmission assembly 102 may be a gear train. The cycloidal gear or the gear train may have an input shaft or output shaft that inputs or outputs rotation.

Compared to the traditional plastic gearbox, the adjusting mechanism 1013 is provided around the body 100. The adjusting mechanism 1013 can be operable to squeeze the body 1011 inwardly to reduce an inner diameter of the body 1011. In this way, a fit error between the inner engaging portion 1012 and the transmission assembly 102 can be reduced or compensated.

In this way, the backlash between the inner engaging portion 1012 and the transmission assembly 102 will be reduced efficiently. As a result, the vibration and noise may be reduced as well, improving the lifetime of the plastic gearbox 100. Furthermore, because the adjusting mechanism 102 as a part of the housing 101 surrounds the body 1011, the strength requirements of the housing 101 can be met with a thinner wall of the body 1011. That is, the body 1011 which is made of plastic does not need to be too thick.

As a result, the difficulty of injection molding process can be substantially reduced and manufacturing precision can be significantly improved. Furthermore, the thinner wall of the body 1011 makes the body 1011 more flexible. In addition, as the materials used to manufacture the body 100 are reduced, the manufacturing costs are correspondingly reduced.

Figure 3:
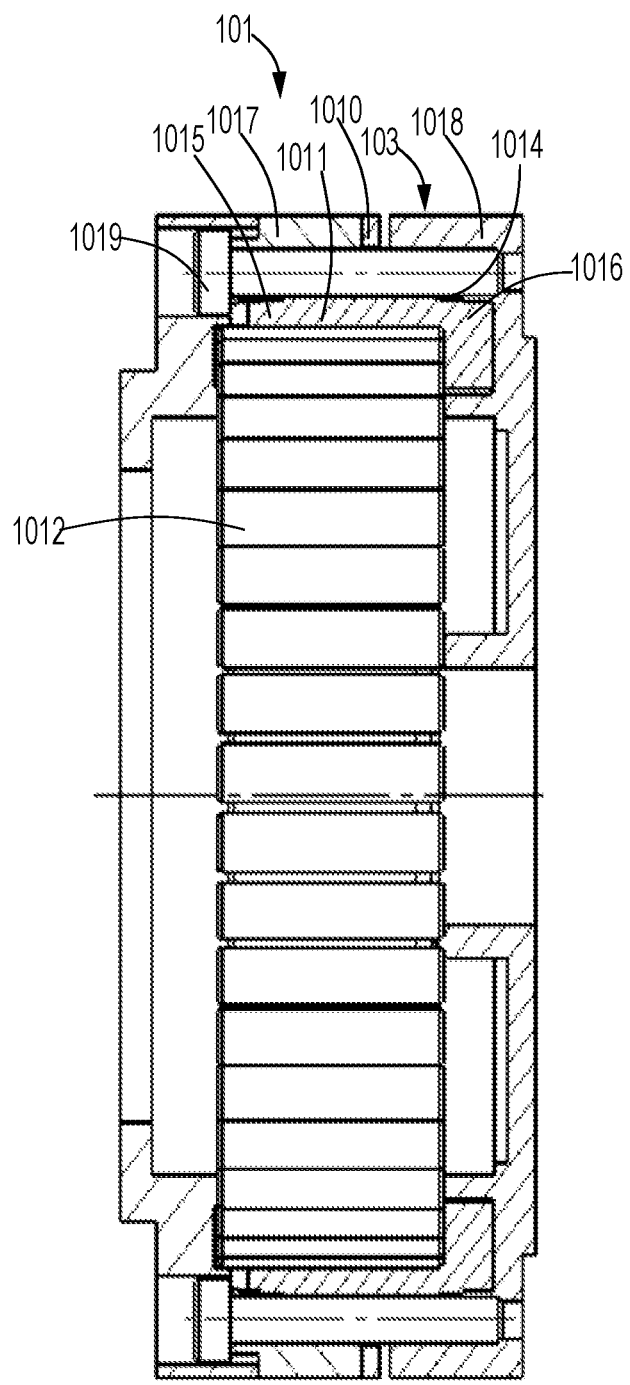
FIG. 3 shows a sectional side view of a plastic gearbox according to embodiments of the present disclosure.
Figure 4:
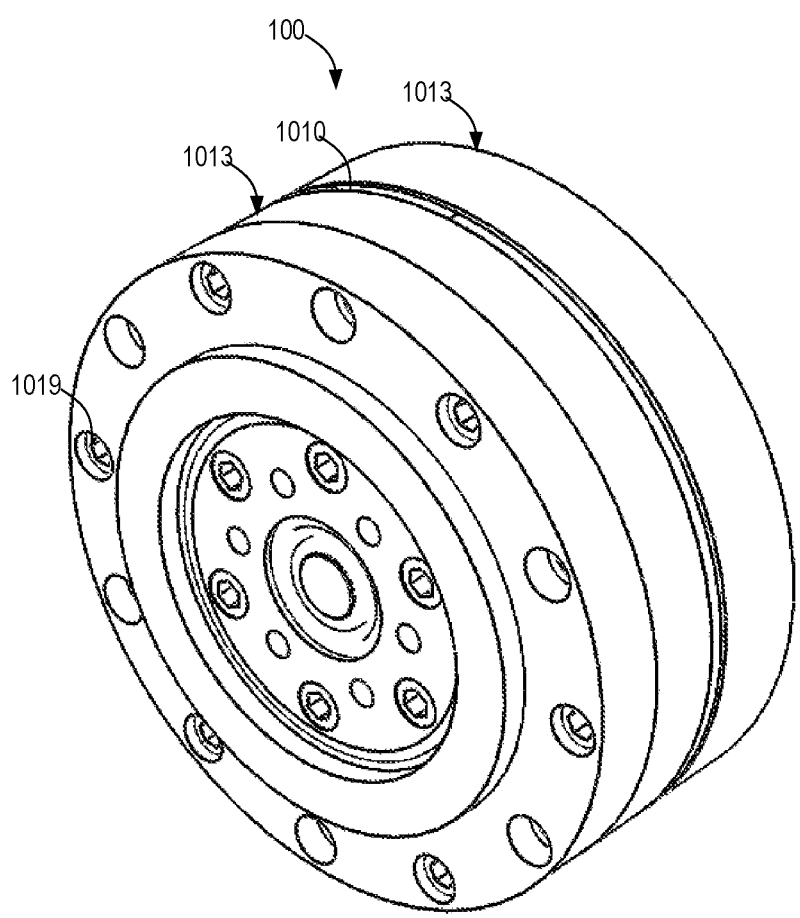
FIG. 4 shows a perspective view of a plastic gearbox according to embodiments of the present disclosure.

The body 1011 may be squeezed in various ways. For example, in some embodiments as shown in FIGS. 2-4, the body 1011 may comprise two taper portions, namely, a first taper portion 1015 and a second taper portion 1016 to be squeezed by the adjusting mechanism 1013. The first and second taper portions 1015, 1016 are arranged on an outer surface of the body 1011. The first and second taper portions 1015, 1016 taper in a direction away from each other.

Correspondingly, the adjusting mechanism 1013 may comprise first and second squeeze bodies 1017, 1018 that surround the first and second taper portions 1015, 1016, respectively. The first and second squeeze bodies 1017, 1018 may each has an inner surface that is fitted with the first and second taper portions 1015, 1016, respectively. That is, the inner surface of the first or second squeeze body 1017, 1018 may be of a tapered shape.

In some embodiments, the body 1011 and the first or second squeeze body 1017, 1018 may be made of different materials. For example, the body 1011 may be made with a material with a good self-lubricant and flexible performances, such as polyformaldehyde (POM). In this way, the manufactured body 1011 with this material may be squeezed more easily. Furthermore, the first or second squeeze body 1017, 1018 may be made with a material that is stiffer, such as glass fiber reinforced plastic or metal.

The adjusting mechanism 1013 may further comprise a plurality of adjusting elements 1019. The plurality of adjusting elements 1019 may be arranged in a circumferential direction of the adjusting mechanism 1013. In some embodiments, the adjusting elements 1019 may be evenly arranged to make the adjusting mechanism 1013 more evenly stressed, thereby improving the stability of the overall structure.

The adjusting element 1019 may be operable to move the first and second squeeze bodies 1017, 1018 towards each other to thereby squeeze the body 1011. For example, in some embodiments, the adjusting elements 1019 may be bolts. The bolts may be screwed into threaded holes formed in the second squeeze body 1018 through unthreaded holes formed in the first squeeze body 1017. In this way, with a rotation of the bolts, the first and second squeeze bodies 1017, 1018 may be moved towards each other.

In order to prevent looseness of the bolts, the bolts may have a self-locking helix angle. Furthermore, in some alternative embodiments, the adjusting elements 1019 may be secured by glue, welding or the like. In this way, the adjusting elements 1019 are not easy to loose and thus the plastic gearbox 100 becomes more robust.

It should be understood that the embodiments where the bolts are used to move the first and second squeeze bodies 1017, 1018 closer are merely for illustration, without suggesting any limitations as to the scope of the present disclosure. Any other suitable structures and arrangements are possible as well. For example, in some alternative embodiments, the adjusting element 1019 may also employ a combination of the bolts and nuts.

In order to prevent excessive compression of the body 1011, in some embodiments, a spacer 1010 may be provided between the first and second squeeze bodies 1017, 1018. The first and second squeeze bodies 1017, 1018 may be moved to the extent that they are in contact with the spacer 1010. In this way, the spacer 1010 may be used to define a minimum distance between the first and second squeeze bodies 1017, 1018.

For example, in some embodiments, the minimum distance between the first and second squeeze bodies 1017, 1018 may represent that a minimum error level between the inner engaging portion 1012 and the transmission assembly 102 is reached. In this way, a user may only need to operate the adjusting elements 1019 until the first and second squeeze bodies 1017, 1018 are in contact with the spacer 1010. As a result, the compensation of the fit error becomes easier.

The spacer 1010 may also be changed to meet the various requirements on the fit accuracy between the inner engaging portion 1012 and the transmission assembly 102. In some embodiments, the spacer 1010 may be omitted.

Furthermore, as shown in FIGS. 2 and 3, the adjusting elements 1019 are arranged on a visible end of the plastic gearbox 101, making the adjusting elements 1019 can be operated more easily. The user can compensate the fit error by easily operating the adjusting elements 1019 from the visible end without dissembling the plastic gearbox 100.

Embodiments in which the fit error is compensated by the tapered structure are exemplarily described above. It should be understood that the above embodiments are merely for illustration, without suggesting any limitations as to the scope of the present disclosure. Any other suitable structures and arrangements are possible as well.

For example, in some alternative embodiments, the body 1011 may also be squeezed using an adjusting hoop 1014. The adjusting hoop may surround the body that is of a cylinder shape. In some embodiments, the adjusting hoop may be formed with a metal belt. The adjusting hoop in a form of the metal belt may surround the body 1011 with a separating portion 1021. That is, the separating portion breaks or separates the adjusting hoop in an axial direction.

At least one adjusting element 1019 may be arranged tangentially at the separating portion. To this end, there may be some cooperating structure, such as a nut with a threaded hole in which the adjusting element 1019 may be screwed, arranged adjacent to the separating portion. In this way, with a rotation of the adjusting element 1019 in the threaded hole, a circumferential size of the separating portion may be reduced thereby to squeeze the body 1011.

With this arrangement, the compensation of the fit error may be achieved more easily. Furthermore, it is to be understood that the body 1011 may also be squeezed in many other ways besides the approaches that are exemplarily described above.

With the body 1011 being squeezed, for the plastic cycloidal gearbox, the cylinder pins may be assembled in the body 1011 more easily. Specifically, considering that the body 1011 may be squeezed, in the manufacturing process of the body 1011, size including the inner diameter and sizes of grooves for receiving the cylinder pins of the body 1011 may be enlarged appropriately.

In this way, the cylinder pins may be coupled to the grooves more easily. With the body 1011 being squeezed in the assembly process, the sizes including the inner diameter and sizes of grooves are reduced. As a result, the fit error is compensated and the cylinder pins may be secured in the groove more tightly as well.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. A housing for a plastic gearbox, comprising:
a body comprising an inner engaging portion circumferentially arranged on an inner surface of the body, the inner engaging portion adapted to be engaged with a transmission assembly of the plastic gearbox; and
an adjusting mechanism arranged around the body and operable to squeeze the body inwardly to reduce an inner diameter of the body, and
wherein the inner engaging portion comprises a plurality of gear teeth.

2. The housing of claim 1, wherein the body comprises:
a first taper portion and a second taper portion axially arranged on an outer surface of the body, the first and second taper portions tapering in a direction away from each other, and
wherein the adjusting mechanism comprises:
a first squeeze body surrounding the first taper portion and comprising an inner surface fitted with the first taper portion;
a second squeeze body surrounding the second taper portion and comprising an inner surface fitted with the second taper portion; and
a plurality of adjusting elements arranged in a circumferential direction of the adjusting mechanism and coupled to the first and second squeeze bodies, the adjusting element being operable to move the first and second squeeze bodies towards each other to thereby squeeze the body.

3. The housing of claim 2, wherein the adjusting mechanism further comprises a spacer arranged between the first and second squeeze bodies, the spacer defining a minimum distance between the first and second squeeze bodies.

4. The housing of claim 2, wherein the adjusting element comprises an adjusting bolt having a self-locking helix angle.

5. The housing of claim 2, wherein the plurality of adjusting elements are evenly arranged in the circumferential direction of the adjusting mechanism.

6. The housing of claim 1, wherein the adjusting mechanism comprises:
an adjusting hoop surrounding the body and comprising a separating portion breaking the adjusting hoop in an axial direction; and
at least one adjusting element arranged tangentially at the separating portion and operable to reduce a circumferential size of the separating portion to thereby squeeze the body.

7. The housing of claim 6, wherein the body is of a cylinder shape.

8. The plastic gearbox, comprising:
the housing of claim 1; and
the transmission assembly configured to be engaged with the inner engaging portion of the housing.

9. A robot, comprising the plastic gearbox of claim 8.

10. A housing for a plastic gearbox, comprising:
a body comprising an inner engaging portion circumferentially arranged on an inner surface of the body, the inner engaging portion adapted to be engaged with a transmission assembly of the plastic gearbox; and
an adjusting mechanism arranged around the body and operable to squeeze the body inwardly to reduce an inner diameter of the body, and
wherein the body comprises:
a first taper portion and a second taper portion axially arranged on an outer surface of the body, the first and second taper portions tapering in a direction away from each other, and
wherein the adjusting mechanism comprises:
a first squeeze body surrounding the first taper portion and comprising an inner surface fitted with the first taper portion;
a second squeeze body surrounding the second taper portion and comprising an inner surface fitted with the second taper portion; and
a plurality of adjusting elements arranged in a circumferential direction of the adjusting mechanism and coupled to the first and second squeeze bodies, the adjusting element being operable to move the first and second squeeze bodies towards each other to thereby squeeze the body.

11. The housing of claim 10, wherein the adjusting mechanism further comprises a spacer arranged between the first and second squeeze bodies, the spacer defining a minimum distance between the first and second squeeze bodies.

12. The housing of claim 10, wherein the adjusting element comprises an adjusting bolt having a self-locking helix angle.

13. The housing of claim 10, wherein the plurality of adjusting elements are evenly arranged in the circumferential direction of the adjusting mechanism.

14. The housing of claim 10, wherein the inner engaging portion comprises a plurality of cylinder pins arranged evenly in the inner surface of the body.

15. The housing of claim 10, wherein the inner engaging portion comprises a frictional surface.

16. A housing for a plastic gearbox, comprising:
a body comprising an inner engaging portion circumferentially arranged on an inner surface of the body, the inner engaging portion adapted to be engaged with a transmission assembly of the plastic gearbox; and
an adjusting mechanism arranged around the body and operable to squeeze the body inwardly to reduce an inner diameter of the body,
wherein the adjusting mechanism comprises:
an adjusting hoop surrounding the body and comprising a separating portion breaking the adjusting hoop in an axial direction; and
at least one adjusting element arranged tangentially at the separating portion and operable to reduce a circumferential size of the separating portion to thereby squeeze the body.

17. The housing of claim 16, wherein the body is of a cylinder shape.

18. The housing of claim 16, wherein the inner engaging portion comprises a plurality of cylinder pins arranged evenly in the inner surface of the body.

19. The housing of claim 16, wherein the inner engaging portion comprises a frictional surface.

* * * * *